(12) United States Patent  (10) Patent No.: US 9,279,968 B2
Heu  (45) Date of Patent: Mar. 8, 2016

(54) ZOOM LENS AND PHOTOGRAPHING APPARATUS INCLUDING THE SAME

(75) Inventor: Min Heu, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 464 days.

(21) Appl. No.: 13/564,156

(22) Filed: Aug. 1, 2012

(65) Prior Publication Data

US 2013/0114144 A1  May 9, 2013

(30) Foreign Application Priority Data

Nov. 4, 2011  (KR) .................. 10-2011-0114505

(51) Int. Cl.
*G02B 27/64* (2006.01)
*G02B 15/177* (2006.01)
*G02B 9/62* (2006.01)

(52) U.S. Cl.
CPC ............... *G02B 15/177* (2013.01); *G02B 9/62* (2013.01); *G02B 27/646* (2013.01); *G03B 2205/0015* (2013.01)

(58) Field of Classification Search
None
See application file for complete search history.

(56) References Cited

U.S. PATENT DOCUMENTS

| | | | |
|---|---|---|---|
| 5,798,872 A | 8/1998 | Uzawa | |
| 5,930,051 A | 7/1999 | Sato | |
| 6,215,599 B1 * | 4/2001 | Ohtake | ........................ 359/688 |
| 6,229,962 B1 | 5/2001 | Imamura | |
| 6,285,510 B1 | 9/2001 | Tsutsumi | |
| 6,307,683 B1 | 10/2001 | Miyano | |
| 6,490,096 B2 | 12/2002 | Miyano | |
| 6,545,818 B2 | 4/2003 | Usui et al. | |
| 6,560,016 B2 | 5/2003 | Usui et al. | |
| 6,594,087 B2 | 7/2003 | Uzawa et al. | |
| 6,674,581 B2 | 1/2004 | Miyano | |
| 6,825,990 B2 | 11/2004 | Yoshimi et al. | |
| 7,009,780 B2 | 3/2006 | Ishii | |
| 7,012,759 B2 | 3/2006 | Betensky et al. | |
| 7,085,069 B2 | 8/2006 | Toyama | |
| 7,161,742 B2 | 1/2007 | Yamada | |
| 7,301,711 B2 | 11/2007 | Saori | |
| 7,423,812 B2 | 9/2008 | Tejima et al. | |
| 7,495,841 B2 | 2/2009 | Kawakami et al. | |
| 7,630,145 B2 | 12/2009 | Wakazono et al. | |
| 7,907,355 B2 | 3/2011 | Kodaira et al. | |

(Continued)

FOREIGN PATENT DOCUMENTS

JP  2000-028924 A  1/2000
JP  2000-089109 A  3/2000

(Continued)

*Primary Examiner* — Arnel C Lavarias
(74) *Attorney, Agent, or Firm* — Drinker Biddle & Reath LLP

(57) ABSTRACT

A zoom lens and a photographing apparatus including the same. The zoom lens includes, in an order from an object side to an image side: a front lens group having a negative refractive power; an aperture stop; and a rear lens group having a positive refractive power, wherein the front lens group includes a first lens group having a positive refractive power, a second lens group having a negative refractive power, and a third lens group having a negative refractive power, and the third lens group includes at least one positive lens and one negative lens and performs focusing, and the rear lens group includes at least two lens groups that are moved during zooming and have a positive refractive power, wherein at least one of the lenses of the two lens groups perform hand shake correction.

18 Claims, 13 Drawing Sheets

(WIDE ANGLE POSITION)

(MIDDLE POSITION)

(TELEPHOTO POSITION)

(56) References Cited

U.S. PATENT DOCUMENTS

| | | |
|---|---|---|
| 7,916,399 B2 | 3/2011 | Miyano |
| 7,929,222 B2 | 4/2011 | Wakazono et al. |
| 8,023,814 B2 | 9/2011 | Uchida et al. |
| 8,120,850 B2 | 2/2012 | Uchida et al. |
| 8,130,453 B2 | 3/2012 | Uchida et al. |
| 8,169,533 B2 | 5/2012 | Sakamoto |
| 8,190,011 B2 | 5/2012 | Uchida et al. |
| 8,471,946 B2 | 6/2013 | Uchida et al. |
| 8,611,016 B2 * | 12/2013 | Imaoka et al. ............ 359/684 |
| 8,837,055 B2 * | 9/2014 | Imaoka et al. ............ 359/676 |
| 8,908,285 B2 * | 12/2014 | Wada ........................ 359/683 |
| 2010/0091170 A1 | 4/2010 | Miyazaki et al. |
| 2010/0091174 A1 | 4/2010 | Miyazaki et al. |
| 2010/0123956 A1 * | 5/2010 | Wada ........................ 359/683 |
| 2010/0182705 A1 | 7/2010 | Hori et al. |
| 2010/0238566 A1 | 9/2010 | Inomoto et al. |
| 2010/0246025 A1 | 9/2010 | Saito et al. |
| 2011/0317279 A1 * | 12/2011 | Takahashi ................. 359/683 |
| 2013/0342716 A1 * | 12/2013 | Yamamoto et al. ...... 348/208.11 |

FOREIGN PATENT DOCUMENTS

| | | |
|---|---|---|
| JP | 2000-121942 A | 4/2000 |
| JP | 2000-180724 A | 6/2000 |
| JP | 2000-221402 A | 8/2000 |
| JP | 2000-249918 A | 9/2000 |
| JP | 2000-275521 A | 10/2000 |
| JP | 2000-321496 A | 11/2000 |
| JP | 2000-321497 A | 11/2000 |
| JP | 2000-338400 A | 12/2000 |
| JP | 2001-021804 A | 1/2001 |
| JP | 2001-117001 A | 4/2001 |
| JP | 2001-228396 A | 8/2001 |
| JP | 2001-281546 A | 10/2001 |
| JP | 2002-062478 A | 2/2002 |
| JP | 2002-072092 A | 3/2002 |
| JP | 2002-287030 A | 10/2002 |
| JP | 2003-107346 A | 4/2003 |
| JP | 2003-262793 A | 9/2003 |
| JP | 2004-004932 A | 1/2004 |
| JP | 2004-109993 A | 4/2004 |
| JP | 2004-126396 A | 4/2004 |
| JP | 2004-126631 A | 4/2004 |
| JP | 2004-163980 A | 6/2004 |
| JP | 2004-279726 A | 10/2004 |
| JP | 2004-341060 A | 12/2004 |
| JP | 2004-341238 A | 12/2004 |
| JP | 2005-227494 A | 8/2005 |
| JP | 2005-284063 A | 10/2005 |
| JP | 2005-284099 A | 10/2005 |
| JP | 2006-030582 A | 2/2006 |
| JP | 2006-512595 A | 4/2006 |
| JP | 2008-033069 A | 2/2008 |
| JP | 2008-040032 A | 2/2008 |
| JP | 2008-191291 A | 8/2008 |
| JP | 2008-191294 A | 8/2008 |
| JP | 2008-191301 A | 8/2008 |
| JP | 2008-233164 A | 10/2008 |
| JP | 2009-042346 A | 2/2009 |
| JP | 2009-251117 A | 10/2009 |
| JP | 2009-251118 A | 10/2009 |
| JP | 2009-282199 A | 12/2009 |
| JP | 2009-282200 A | 12/2009 |
| JP | 2009-282201 A | 12/2009 |
| JP | 2009-282202 A | 12/2009 |
| JP | 2010-122423 A | 6/2010 |
| JP | 2010-175954 A | 8/2010 |
| JP | 2010-175956 A | 8/2010 |
| JP | 2010-175957 A | 8/2010 |
| JP | 2010-175958 A | 8/2010 |
| JP | 2010-175959 A | 8/2010 |
| JP | 2010-175971 A | 8/2010 |
| JP | 2010-186179 A | 8/2010 |
| JP | 2010-217735 A | 9/2010 |
| JP | 2010-237455 A | 10/2010 |

* cited by examiner (WIDE ANGLE POSITION)

(MIDDLE POSITION)

(TELEPHOTO POSITION)

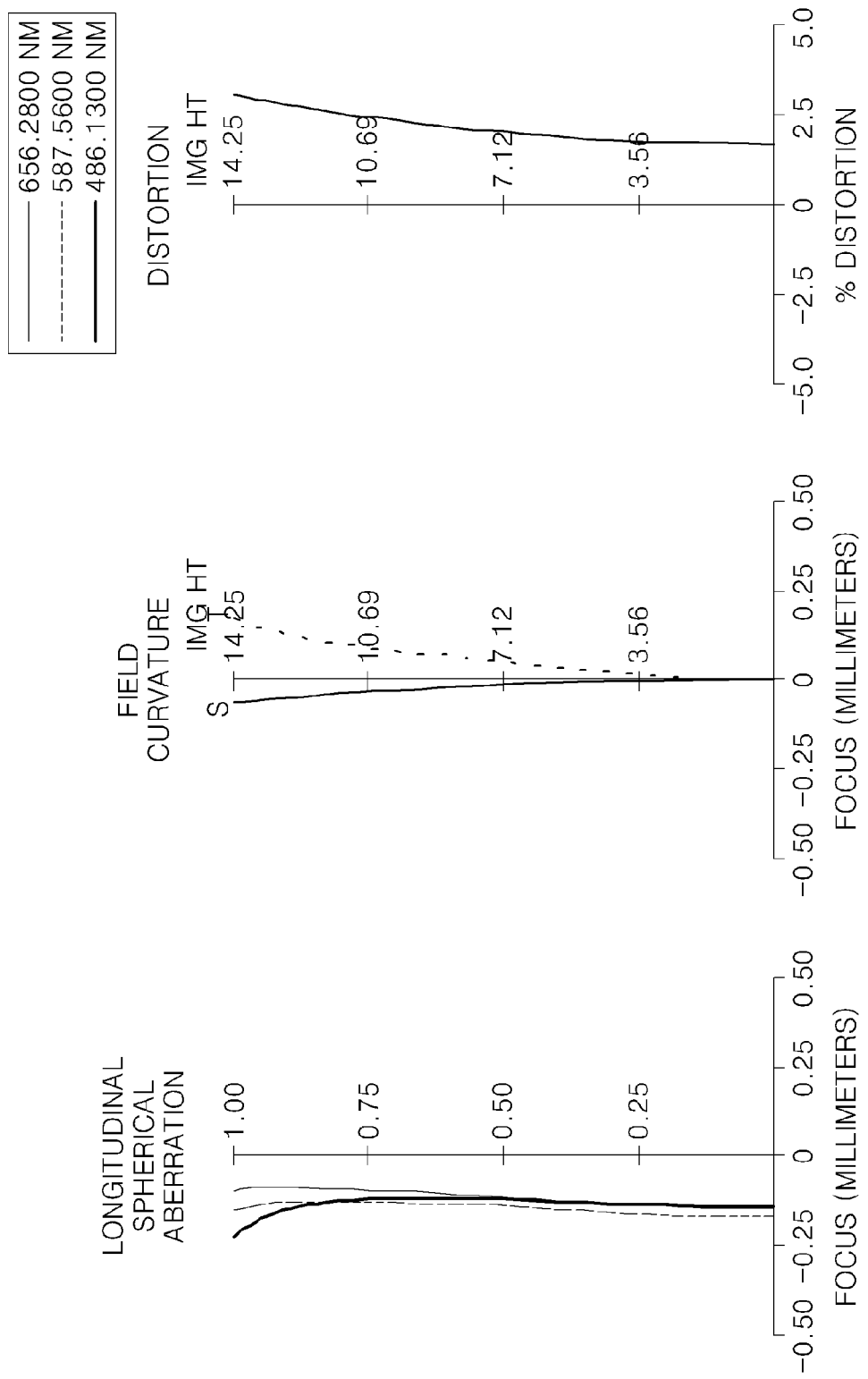

(WIDE ANGLE POSITION)

(MIDDLE POSITION)

(TELEPHOTO POSITION)

ZOOM LENS AND PHOTOGRAPHING APPARATUS INCLUDING THE SAME

CROSS-REFERENCE TO RELATED PATENT APPLICATION

This application claims the benefit of Korean Patent Application No. 2011-0114505, filed on Nov. 4, 2011, in the Korean Intellectual Property Office, the disclosure of which is incorporated herein in its entirety by reference.

BACKGROUND

1. Field

The disclosure relates to a zoom lens which may perform auto-focusing, has a small size, and is bright, and a photographing apparatus including the zoom lens.

2. Description of the Related Art

Users of digital cameras, video cameras, or the like desire to use exchangeable lenses having high resolution, high zooming rate, large caliber, etc. In addition, as the users have become more skillful, lens systems that have a small size and a small F number (Fno), i.e., bright lens systems, need to be developed. However, when a lens system having a bright lens with a small Fno is developed, the configuration of the lens system is complicated, and it is difficult to reduce the size and weight of the lens system.

In addition, in an auto-focusing (AF) method that requires frequent movement of a focusing lens group, such as contrast auto-focusing (AF), a small-sized and light-weight AF lens group is needed so as to perform fast AF.

SUMMARY

The present disclosure provides a zoom lens having excellent optical performance and including a small-sized and light-weight focusing lens group.

The present disclosure also provides a large caliber zoom lens on which hand shake correction may be performed.

According to an embodiment, there is provided a zoom lens including, in an order from an object side to an image side: a front lens group having a negative refractive power; an aperture stop; and a rear lens group having a positive refractive power, wherein the front lens group includes a first lens group having a positive refractive power, a second lens group having a negative refractive power, and a third lens group having a negative refractive power, and the third lens group includes at least one positive lens and one negative lens and performs focusing, and the rear lens group includes at least two lens groups that move during zooming and have a positive refractive power, wherein some of the at least two lens groups perform hand shake correction, and the zoom lens satisfies the following Equations:

$$1.5 < |(1-m_s^2) \cdot m_R^2| < 6$$

$$1.0 < f1/f_T < 3.0$$

where $m_s$ is the magnification of the third lens group at a telephoto position of the zoom lens, $m_R$ is the synthesis magnification of the rear lens group in the telephoto position of the zoom lens, $f_T$ is the overall focal length in the telephoto position of the zoom lens, and f1 is the focal length of the first lens group.

When moving from the wide angle position to the telephoto position during zooming, the first lens group and the third lens group may be moved, and the second lens group may be fixed.

When moving from the wide angle position to the telephoto position, the first lens group may be moved to the object side based on an image plane.

The zoom lens may satisfy the following Equation:

$$0.1 < L1/LT < 0.25$$

where L1 is the distance the first lens group moves during zooming from the wide angle position to the telephoto position, and LT is the overall length of the zoom lens in the telephoto position.

One or both of the two lens groups that perform hand shake correction may include at least one positive lens and one negative lens.

The second lens group may include a plurality of negative lenses and at least one positive lens.

The plurality of negative lenses may include at least one aspherical surface.

At least one of the plurality of negative lenses of the second lens group may satisfy the following Equation:

$$nd > 1.85$$

where nd is a refractive index.

The rear lens group may include a fourth lens group, a fifth lens group, and a sixth lens group that move during zooming, respectively, and the fifth lens group may perform hand shake correction.

The rear lens group may include a fourth lens group and a fifth lens group that move during zooming, respectively, and one or more lenses of the fifth lens group may perform hand shake correction.

The rear lens group may include a fourth lens group and a fifth lens group that move during zooming, respectively, and one or more lenses of the fourth lens group may perform hand shake correction The third lens group may include a cemented lens including a positive lens and a negative lens.

The zoom lens may have an F number in a range of 2.8 to 4, and the F number of the zoom lens may not vary during zooming.

According to another embodiment, there is provided a photographing apparatus including: a zoom lens; and an image device that receives light of an image formed by the zoom lens, wherein the zoom lens includes, in an order from an object side to an image side: a front lens group having a negative refractive power; an aperture stop; and a rear lens group having a positive refractive power, wherein the front lens group includes a first lens group having a positive refractive power, a second lens group having a negative refractive power, and a third lens group having a negative refractive power, and the third lens group includes at least one positive lens and one negative lens and performs focusing, and the rear lens group includes at least two lens groups that move during zooming and have a positive refractive power, wherein one or more lenses of the at least two lens groups perform hand shake correction, and the zoom lens satisfies the following Equations:

$$1.5 < |(1-m_s^2) \cdot m_R^2| < 6$$

$$1.0 < f1/f_T < 3.0$$

where $m_s$ is the magnification of the third lens group in a telephoto position of the zoom lens, $m_R$ is the synthesis magnification of the rear lens group in the telephoto position of the zoom lens, $f_T$ is the overall focal length in the telephoto position of the zoom lens, and f1 is the focal length of the first lens group.

BRIEF DESCRIPTION OF THE DRAWINGS

The above and other features and advantages will become more apparent by the following detailed description of exemplary embodiments thereof with reference to the attached drawings in which:

FIGS. 2A through 2C are charts of aberrations at the wide angle position and telephoto position of the zoom lens of FIG. 1, respectively;

DETAILED DESCRIPTION

Figure 1:
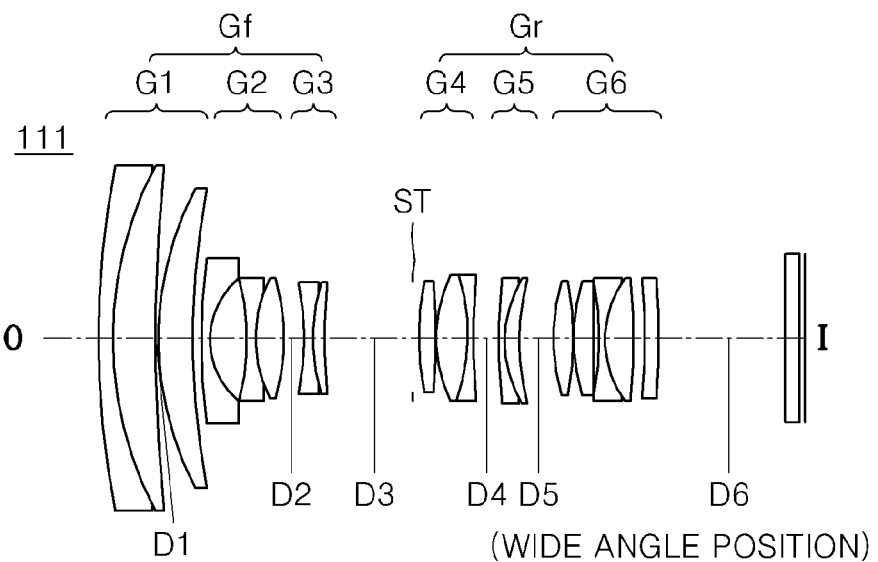
FIG. 1 shows cross-sectional views at the wide angle position, middle position, and telephoto position of a zoom lens according to an embodiment.
Figure 1:
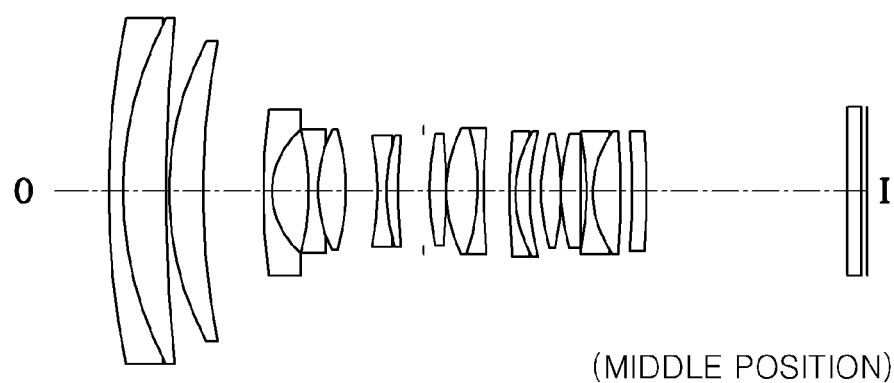
Figure 1:
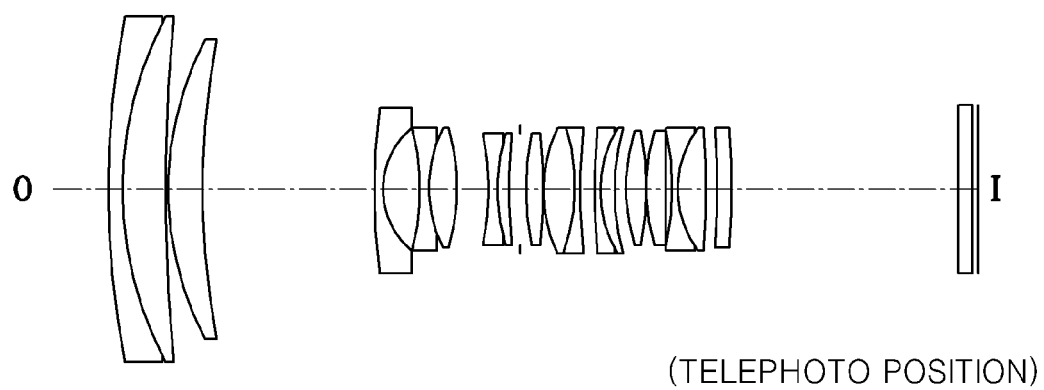

Embodiments will now be described more fully with reference to the accompanying drawings, in which exemplary embodiments of the invention are shown. Like reference numerals in the drawings denote like elements, and sizes or thicknesses of elements may be exaggerated for clarity. Embodiments may take many different forms and should not be construed as being limited to the embodiments set forth herein.

Referring to FIG. 1, the zoom lens 111 includes a front lens group Gf, an aperture stop ST, and a rear lens group Gr, which are sequentially arranged from an object side O to an image side I.

The front lens group Gf may include a first lens group G1 having a positive refractive power, a second lens group G2 having a negative refractive power, and a third lens group G3 having a negative refractive power.

The first lens group G1 may include three lenses including a negative lens, a positive lens, and a positive lens, for example. Each of the negative lens and the positive lens may be a cemented lens. The second lens group G2 may include a plurality of negative lenses and at least one positive lens. The plurality of negative lenses may include at least one aspherical surface. In addition, some lenses of the second lens group G2 are formed of a material having a high refractive index so that coma aberration and astigmatism may be efficiently suppressed.

The third lens group G3 may perform focusing so as to correct a variation in an image plane caused by a variation in a position of an object. A focusing lens group may have a small number of lenses and a small size so as to perform focusing quickly. The third lens group G3 may include at least one positive lens and one negative lens, for example. FIG. 1 illustrates an example of the third lens group G3 including one positive lens and one negative lens. In addition, one positive lens and one negative lens may be a cemented lens. The focusing lens group may be small-sized in this way so that auto-focusing may be quickly performed and chromatic aberration may be suppressed and thus deterioration of performance caused by an object distance may be reduced.

During zooming from the wide angle position to the telephoto position, the first lens group G1 and the third lens group G3 may be moved, and the second lens group G2 may be fixed. For example, during zooming from the wide angle position to the telephoto position, the first lens group G1 may be moved to the object side O based on the image plane.

When the distance between all lens groups varies during zooming, driving units for movement of all lens groups have to be provided so as to perform movement during zooming. Since complicated mechanical features are included in these driving units, the cost of the zoom lens increases, and design performance of the zoom lens during manufacture thereof may not be easily ensured due to optical sensitivity. In order to obtain a low cost and stable optical system, some lens groups may be fixed during zooming. To this end, the second lens group G2 may be fixed with respect to the image plane during zooming. Thus, the amount of movement of the first lens group G1 during zooming may be reduced, and the length of the zoom lens in the telephoto position may be reduced.

The rear lens group Gr may include at least two lens groups that move during zooming and have a positive refractive power. For example, the rear lens group Gr may include a fourth lens group G4, a fifth lens group G5, and a sixth lens group G6. However, aspects of the present embodiment are not limited thereto, and the rear lens group Gr may include the fourth lens group G4 and the fifth lens group G5.

Figure 3:
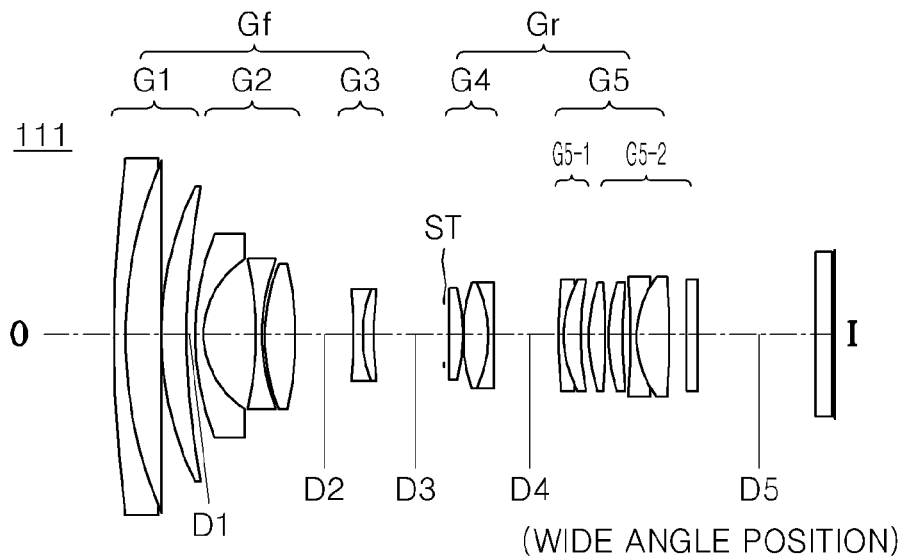
FIG. 3 shows cross-sectional views at the wide angle position, middle position, and telephoto position of a zoom lens according to another embodiment.
Figure 3:
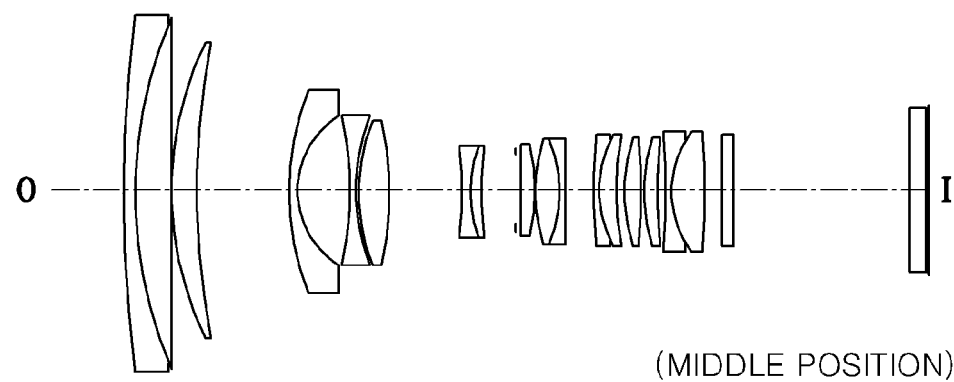
Figure 3:
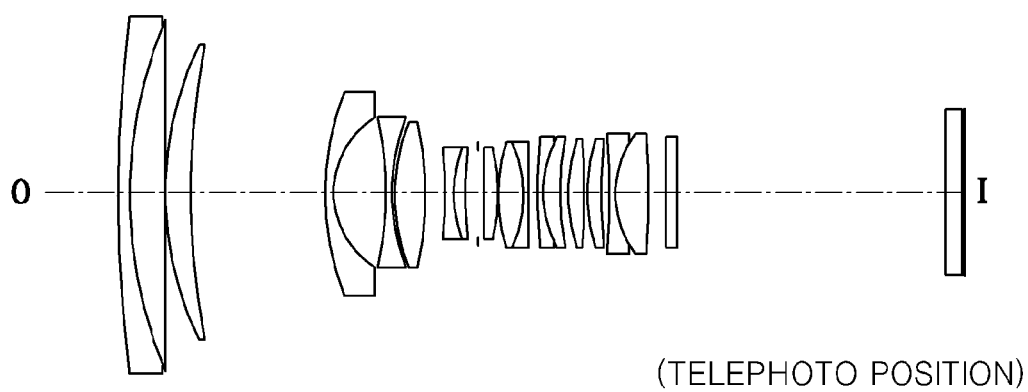
Figure 5:
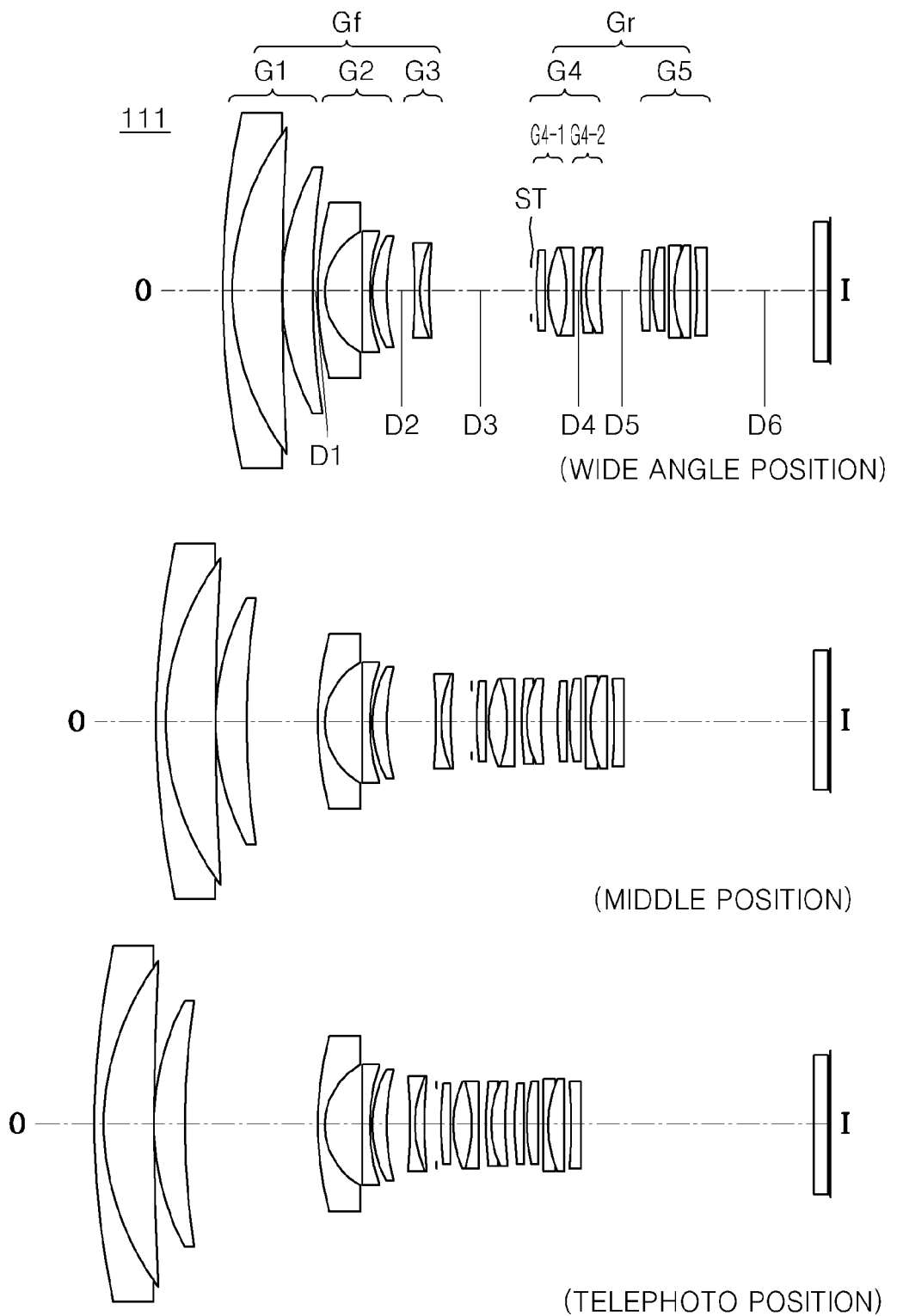
FIG. 5 shows cross-sectional views at the wide angle position, middle position, and telephoto position of a zoom lens according to another embodiment.

In addition, the rear lens group G4 may include a lens group that performs hand shake correction. A hand shake correction function is performed by moving a lens group perpendicular to the optical axis. In order to suppress a variation in aberration during movement of the lens group performing hand shake correction, the lens group performing hand shake correction may be a cemented lens including a lens having a positive refractive power and a lens having a negative refractive power. By performing hand shake correction, a good quality image may be obtained even in a dark environment. For example, in FIG. 1, the fifth lens group G5 may perform hand shake correction. Alternatively, as illustrated in FIG. 3, the fifth lens group G5 may include a first sub-lens group G5-1 and a second sub-lens group G5-2, and the first sub-lens group G5-1 may perform hand shake correction. Alternatively, as illustrated in FIG. 5, the fourth lens group G4 may include a first sub-lens group G4-1 and a second sub-lens group G4-2, and the second sub-lens group G4-2 may perform hand shake correction.

The zoom lens according to the current embodiment may be used in a lens exchangeable camera and may be applied to a standard zoom lens having a large caliber. The zoom lens according to the current embodiment may have an F number (Fno) of about 2.8 to 4, for example, and brightness of the zoom lens does not vary during zooming, and the zoom lens may have a zooming ratio of 3 to 4.

The zoom lens according to the current embodiment may satisfy the following Equations 1 and 2:

$$1.5 < |(1-m_s^2) \cdot m_R^2| < 6 \qquad (1),$$

where $m_s$ is the magnification of the third lens group G3 in the telephoto position of the zoom lens, and $m_R$ is the synthesis magnification of the rear lens group Gr in the telephoto position of the zoom lens. The zoom lens may also satisfy:

$$1.0 < f1/f_T < 3.0 \qquad (2),$$

where f1 is the focal length of the first lens group G1, and $f_T$ is the overall focal length in the telephoto position of the zoom lens.

Equation 1 represents a magnification for correcting an image plane of a focusing lens group. The amount of movement of the focusing lens group for correcting the image plane caused by a variation in an object distance is a physical amount for making the focusing lens group small. In order to make the focusing lens group small, the amount of movement of the focusing lens group has to be small. However, if the amount of movement of the focusing lens group is too small, it may not be easy to obtain accuracy of movement. When $(1-m_s^2) \cdot m_R^2$ is greater than the upper limit value of Equation 1, accurate focusing may not be easily performed. When $(1-m_s^2) \cdot m_R^2$ is less than the lower limit value of Equation 1, the amount of movement of the focusing lens group caused by a variation in an object distance increases, and the size of the focusing lens group increases, and thus it is not easy to constitute a compact lens system.

Equation 2 represents a ratio of the focal length of the first lens group G1 with respect to the focal length of the zoom lens in the telephoto position. When Equation 2 is satisfied, the accuracy of movement units of the focusing lens group may be obtained.

In addition, the zoom lens according to the current embodiment may satisfy the following Equation 3:

$$0.1 < L1/LT < 0.25 \quad (3),$$

where L1 is the distance the first lens group G1 moves from the wide angle position to the telephoto position is performed during zooming, and LT is the overall length of the zoom lens in the telephoto position. Movement of the first lens group during zooming serves to correct image plane movement that occurs during zooming. However, when the amount of movement of the first lens group G1 increases, it is difficult to constitute a small-sized optical system. When L1/LT is greater than the upper limit value of Equation 3, the size of the first lens group G1 may be increased, and when L1/LT is less than the lower limit value of Equation 3, movement of the first lens group during zooming does not serve to correct image plane movement, and it is not easy to obtain sufficient optical performance.

At least one lens among the plurality of negative lenses of the second lens group G2 may satisfy the following Equation 4:

$$nd > 1.85 \quad (4),$$

where nd is a refractive index. At least one lens among the plurality of negative lenses of the second lens group G2 is formed of material having a high refractive index that satisfies Equation 4, so that coma aberration and astigmatism may be reduced.

An aspherical surface according to the current embodiment may be defined as below.

An aspherical surface shape of the zoom lens according to the current embodiment may be defined using the following Equation 5 when an optical axis direction is an x-axis and a direction perpendicular to the optical axis direction is a y-axis and a proceeding direction of light is a positive direction:

$$x = \frac{cy^2}{1 + \sqrt{1-(K+1)c^2y^2}} + Ay^4 + By^6 + Cy^8 + Dy^{10}, \quad (5)$$

where x is the distance from a vertex of a lens in the optical axis direction, y is the distance in a direction perpendicular to the optical axis, K is a conic constant, A, B, C, and D are aspherical coefficients, and c is a reciprocal (1/R) of the radius of curvature at the vertex of the lens.

The zoom lens may have a small size and a wide angle by implementing the following embodiments using various designs.

Hereinafter, f is the focal length of the zoom lens, Fno is an F number, 2ω is the viewing angle, R is the radius of curvature, Dn is the thickness of a center of a lens or the distance between lenses, Nd is a refractive index, and Vd is an Abbe's number. In addition, ST is an aperture stop, and D1, D2, D3, D4, and D5 are variable distances, and * is an aspherical surface. Lenses of each lens group in the drawings denote the same reference numerals. In each embodiment, distance units are mm. Reference numerals 8 and 9 may represent a filter or cover glass.

Embodiment 1

FIG. 1 shows cross-sectional views of at a wide angle position, middle position, and telephoto position of a zoom lens according to a first embodiment and the following Table 1 shows design data of the first embodiment. Although a reference numeral of a lens surface of each lens is shown in FIG. 1, a reference numeral of a lens surface of each lens in the drawings according to other embodiments is omitted.

Referring to FIG. 1, the zoom lens according to the first embodiment includes a first lens group G1 having a positive refractive power, a second lens group G2 having a negative refractive power, a third lens group G3 having a negative refractive power, a fourth lens group G4 having a positive refractive power, a fifth lens group G5 having a negative refractive power, and a sixth lens group G6 having a positive refractive power. The third lens group G3 may perform focusing, and the fifth lens group G5 may perform a hand shake correction function.

TABLE 1

EFL: 16.60~30.00~48.50 mm Fno: 2.9~2.9~2.9
2w: 85.5~50.8~32.3 (degrees)

| Lens surface | Radius of curvature (R) | Thickness (Dn) | Nd | Vd |
|---|---|---|---|---|
| S1 | 157.218 | 2.00 | 1.84666 | 23.8 |
| S2 | 59.575 | 7.82 | 1.72916 | 54.7 |
| S3 | 313.975 | 0.20 | | |
| S4 | 51.556 | 6.09 | 1.78590 | 43.9 |
| S5 | 130.000 | D1 | | |
| S6 | 78.410 | 1.50 | 1.90366 | 31.3 |
| S7 | 13.724 | 6.51 | | |
| S8* | −37.229 | 1.50 | 1.69350 | 53.2 |
| ASP | | | | |
| K: 0.000000 | | | | |
| A: 3.826146e−006 B: −7.101796e−009 C: −5.089970e−011 | | | | |
| D: 0.000000e+000 | | | | |
| S9 | 30.901 | 0.20 | | |
| S10 | 24.968 | 4.81 | 1.72825 | 28.3 |
| S11 | −35.073 | D2 | | |
| S12 | −32.007 | 1.20 | 1.65160 | 58.4 |
| S13 | 30.172 | 2.00 | 1.84666 | 23.8 |
| S14 | 95.077 | D3 | | |
| ST | Infinity | 1.00 | | |
| S16 | 75.733 | 2.66 | 1.80610 | 40.7 |
| S17 | −81.281 | 0.10 | | |
| S18 | 23.110 | 5.19 | 1.48749 | 70.4 |
| S19 | −31.897 | 1.20 | 1.80518 | 25.5 |
| S20 | 132.595 | D4 | | |
| S21 | 198.968 | 1.20 | 1.75520 | 27.5 |
| S22 | 21.318 | 2.50 | 1.92286 | 20.9 |
| S23 | 48.258 | D5 | | |
| S24 | 36.996 | 3.23 | 1.72916 | 54.7 |

TABLE 1-continued

EFL: 16.60~30.00~48.50 mm Fno: 2.9~2.9~2.9
2w: 85.5~50.8~32.3 (degrees)

| | | | | |
|---|---|---|---|---|
| S25 | −74.378 | 0.10 | | |
| S26 | 29.034 | 3.14 | 1.61800 | 63.4 |
| S27 | Infinity | 1.23 | | |
| S28 | −60.228 | 1.20 | 1.83400 | 37.3 |
| S29 | 18.500 | 4.76 | 1.49700 | 81.6 |
| S30 | −67.580 | 2.10 | | |
| S31* | −500.000 | 2.10 | 1.80610 | 40.7 |

ASP
K: −1.000000
A: −2.203537e−005 B: −8.813996e−009 C: −1.745758e−010
D: 0.000000e+000

| | | | | |
|---|---|---|---|---|
| S32 | −267.324 | D6 | | |
| S33 | Infinity | 2.80 | 1.51680 | 64.2 |
| S34 | Infinity | 0.50 | | |
| IMG | | | | |

Table 2 shows data regarding variable distances during zooming.

TABLE 2

| | Wide angle position | Middle position | Telephoto position |
|---|---|---|---|
| D1 | 1.20 | 10.06 | 28.80 |
| D2 | 2.98 | 4.20 | 5.15 |
| D3 | 15.17 | 5.35 | 2.20 |
| D4 | 4.50 | 4.68 | 2.11 |
| D5 | 5.76 | 1.35 | 1.66 |
| D6 | 21.13 | 33.92 | 38.30 |

Figure 2A:
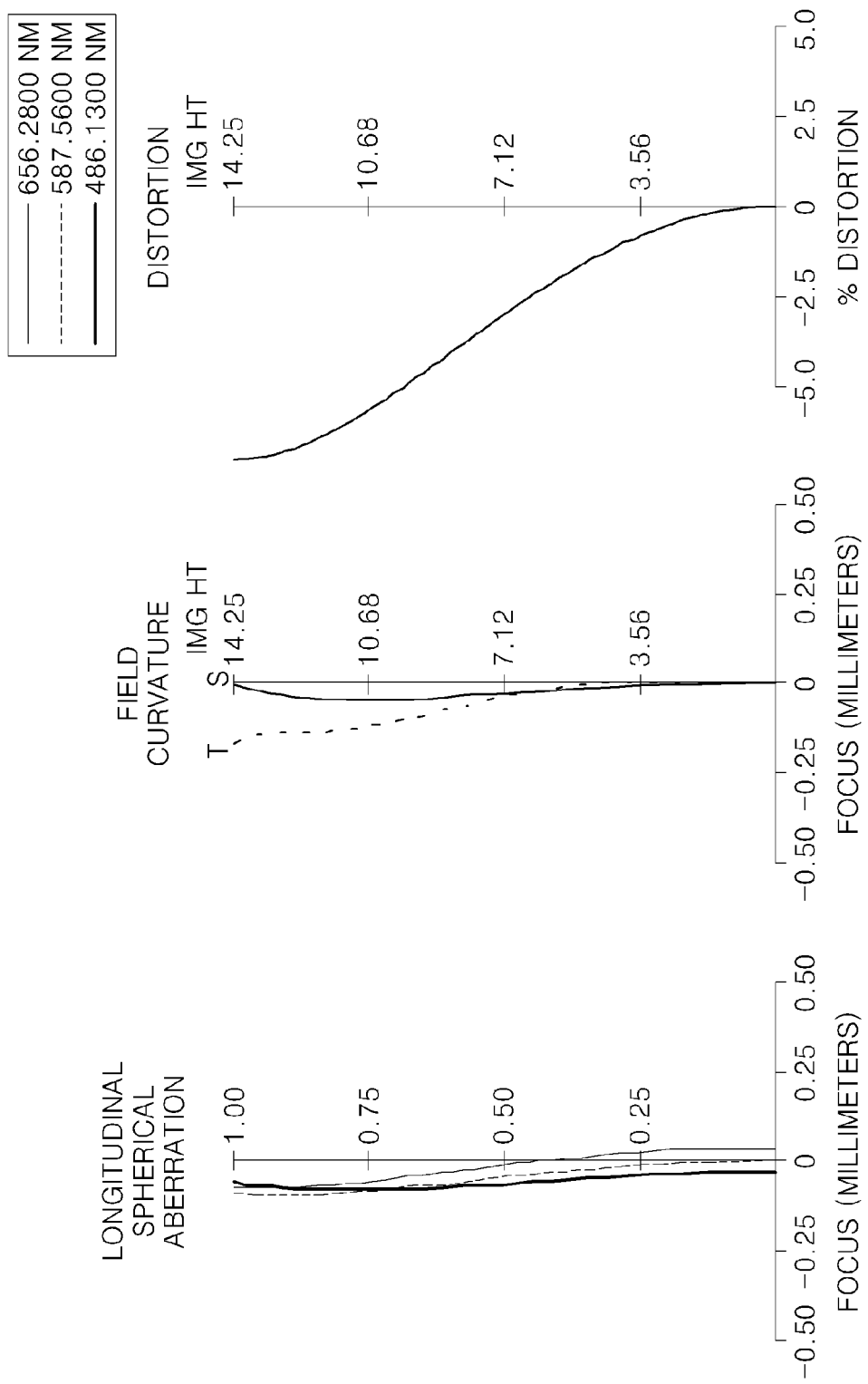
Figure 2B:
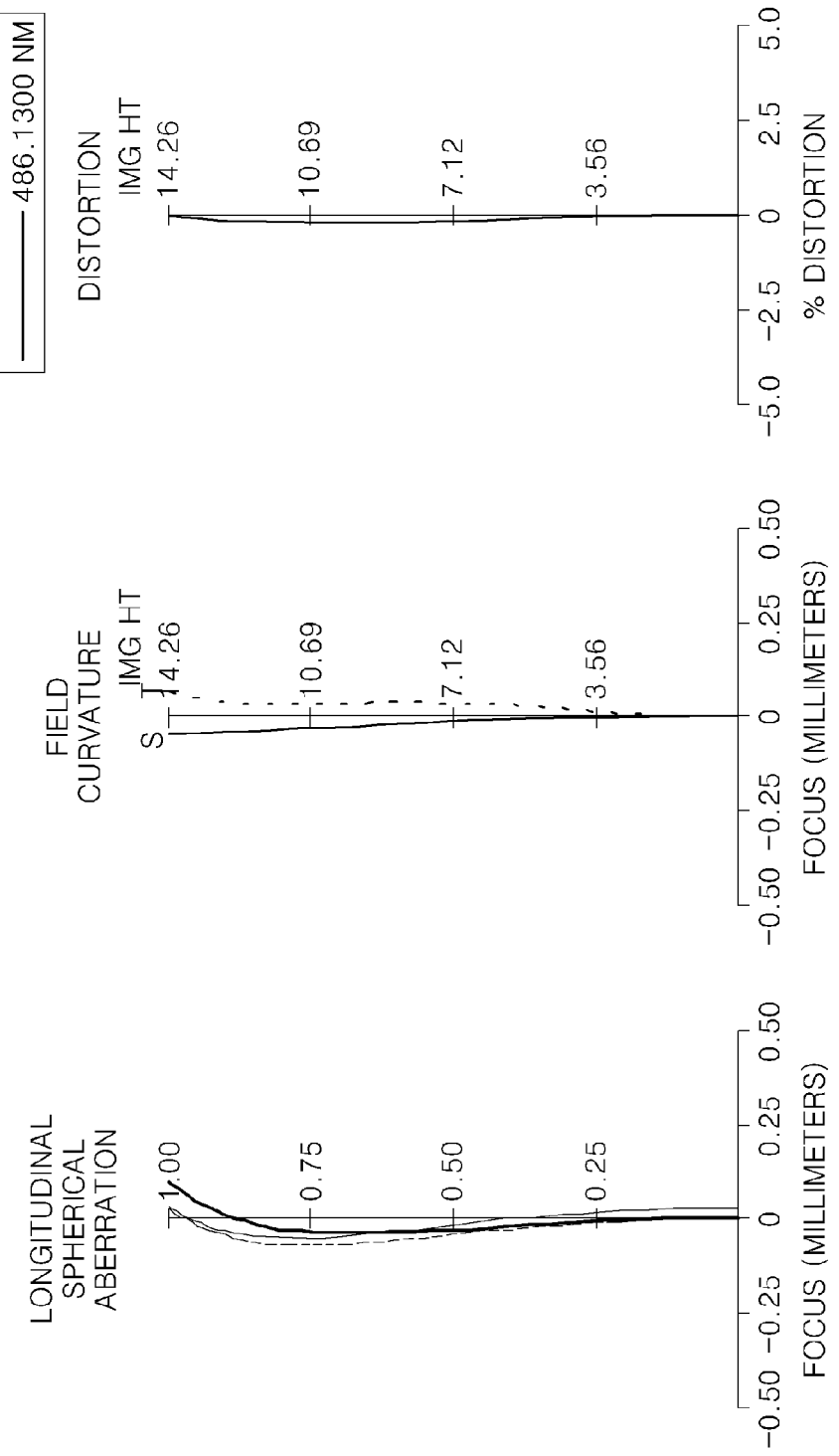

FIGS. 2A through 2C are charts of aberrations showing spherical aberration, field curvature, and distortion aberration at a wide angle position and a telephoto position of the zoom lens of FIG. 1, respectively. Field curvature includes tangential field curvature T and sagittal field curvature S.

Embodiment 2

FIG. 3 illustrates a zoom lens according to a second embodiment, and the following Table 3 shows design data of the second embodiment.

Referring to FIG. 3, the zoom lens according to the second embodiment includes a first lens group G1 having a positive refractive power, a second lens group G2 having a negative refractive power, a third lens group G3 having a negative refractive power, a fourth lens group G4 having a positive refractive power, and a fifth lens group G5 having a positive refractive power. The third lens group G3 may perform focusing. The fifth lens group G5 includes a first sub-lens group G5-1 having a negative refractive power and a second sub-lens group G5-2 having a positive refractive power, and the first sub-lens group G5-1 may perform a hand shake correction function.

TABLE 3

EFL: 16.60~27.50~48.50 mm Fno: 4.0~4.0~4.0
2w: 83.7~54.0~32.3 (degrees)

| Lens surface | Radius | Thick | Ind | Abv |
|---|---|---|---|---|
| S1 | 293.731 | 2.00 | 1.84666 | 23.8 |
| S2 | 74.506 | 6.42 | 1.72916 | 54.7 |
| S3 | 2260.307 | 0.20 | | |
| S4 | 59.256 | 4.26 | 1.78590 | 43.9 |
| S5 | 130.000 | D1 | | |
| S6* | 51.582 | 1.50 | 1.89080 | 34.2 |

TABLE 3-continued

EFL: 16.60~27.50~48.50 mm Fno: 4.0~4.0~4.0
2w: 83.7~54.0~32.3 (degrees)

ASP
K: 0.000000
A: 1.217890e−006 B: 1.452183e−009 C: −1.111672e−011
D: 1.090845e−014

| | | | | |
|---|---|---|---|---|
| S7 | 15.752 | 8.89 | | |
| S8 | −53.547 | 1.20 | 1.74353 | 52.7 |
| S9 | 38.733 | 0.20 | | |
| S10 | 29.047 | 5.27 | 1.74432 | 26.4 |
| S11 | −66.684 | D2 | | |
| S12 | −28.019 | 1.20 | 1.65160 | 58.4 |
| S13 | 22.919 | 2.00 | 1.84666 | 23.8 |
| S14 | 62.902 | D3 | | |
| ST | Infinity | 1.00 | | |
| S16 | 250.936 | 2.30 | 1.80610 | 40.7 |
| S17 | −48.975 | 0.10 | | |
| S18 | 24.758 | 4.10 | 1.48749 | 70.4 |
| S19 | −31.897 | 1.20 | 1.80518 | 25.5 |
| S20 | 285.259 | D4 | | |
| S21 | 56.813 | 1.20 | 1.75545 | 26.5 |
| S22 | 21.313 | 2.50 | 1.92236 | 20.9 |
| S23 | 33.366 | 1.53 | | |
| S24 | 27.702 | 3.27 | 1.72916 | 54.7 |
| S25 | −124.563 | 0.10 | | |
| S26 | 28.729 | 2.79 | 1.61800 | 63.4 |
| S27 | 105.757 | 1.14 | | |
| S28 | −159.888 | 1.20 | 1.83400 | 37.3 |
| S29 | 18.500 | 5.85 | 1.49700 | 81.6 |
| S30 | −133.060 | 2.90 | | |
| S31* | −500.000 | 2.10 | 1.80610 | 40.7 |

ASP
K: −1.000000
A: −2.948866e−005 B: −4.893759e−008 C: −1.825220e−010
D: 0.000000e+000

| | | | | |
|---|---|---|---|---|
| S32 | 655.491 | D5 | | |
| S33 | Infinity | 2.80 | 1.51680 | 64.2 |
| S34 | Infinity | 0.50 | | |
| IMG | | | | |

The following Table 4 shows data regarding variable distances during zooming of the zoom lens according to the second embodiment.

TABLE 4

| Variable distance | Wide angle position | Middle position | Telephoto position |
|---|---|---|---|
| D1 | 1.20 | 16.20 | 23.20 |
| D2 | 10.41 | 12.91 | 4.00 |
| D3 | 12.37 | 5.72 | 2.20 |
| D4 | 10.65 | 4.47 | 1.47 |
| D5 | 20.72 | 31.01 | 46.37 |

Figure 4A:
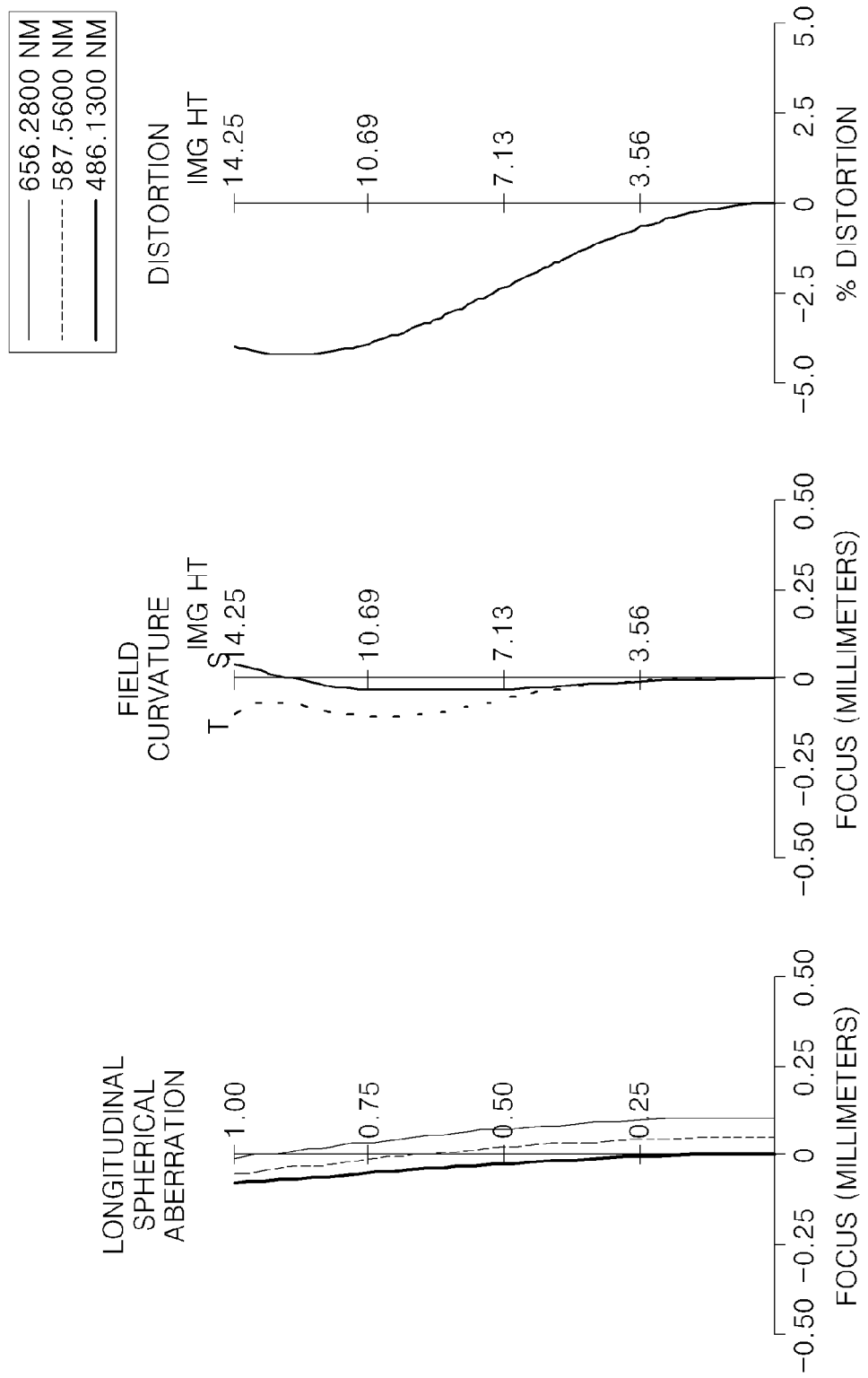
FIGS. 4A through 4C are charts of aberrations at the wide angle position and telephoto position of the zoom lens of FIG. 3, respectively.
Figure 4B:
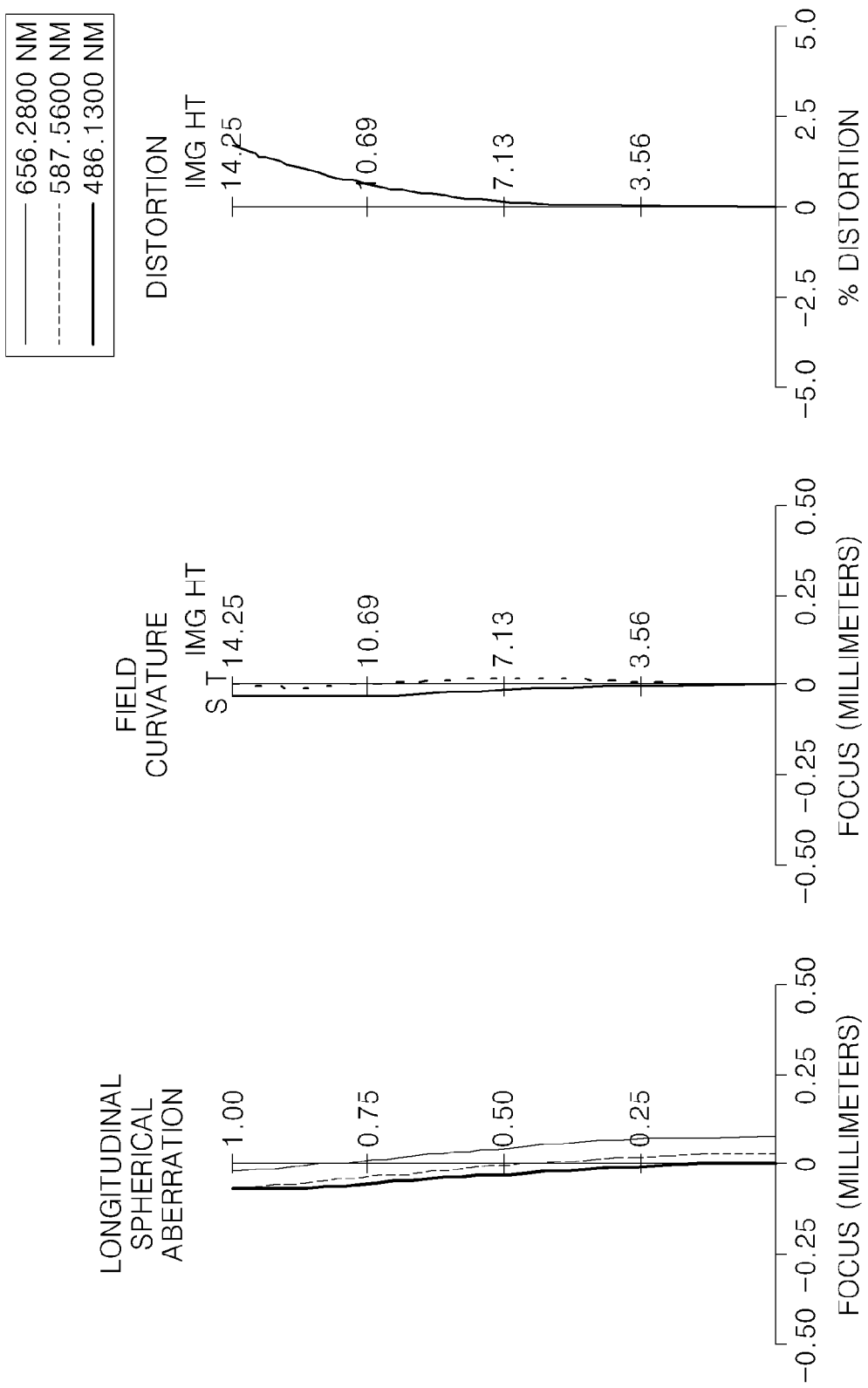
Figure 4C:
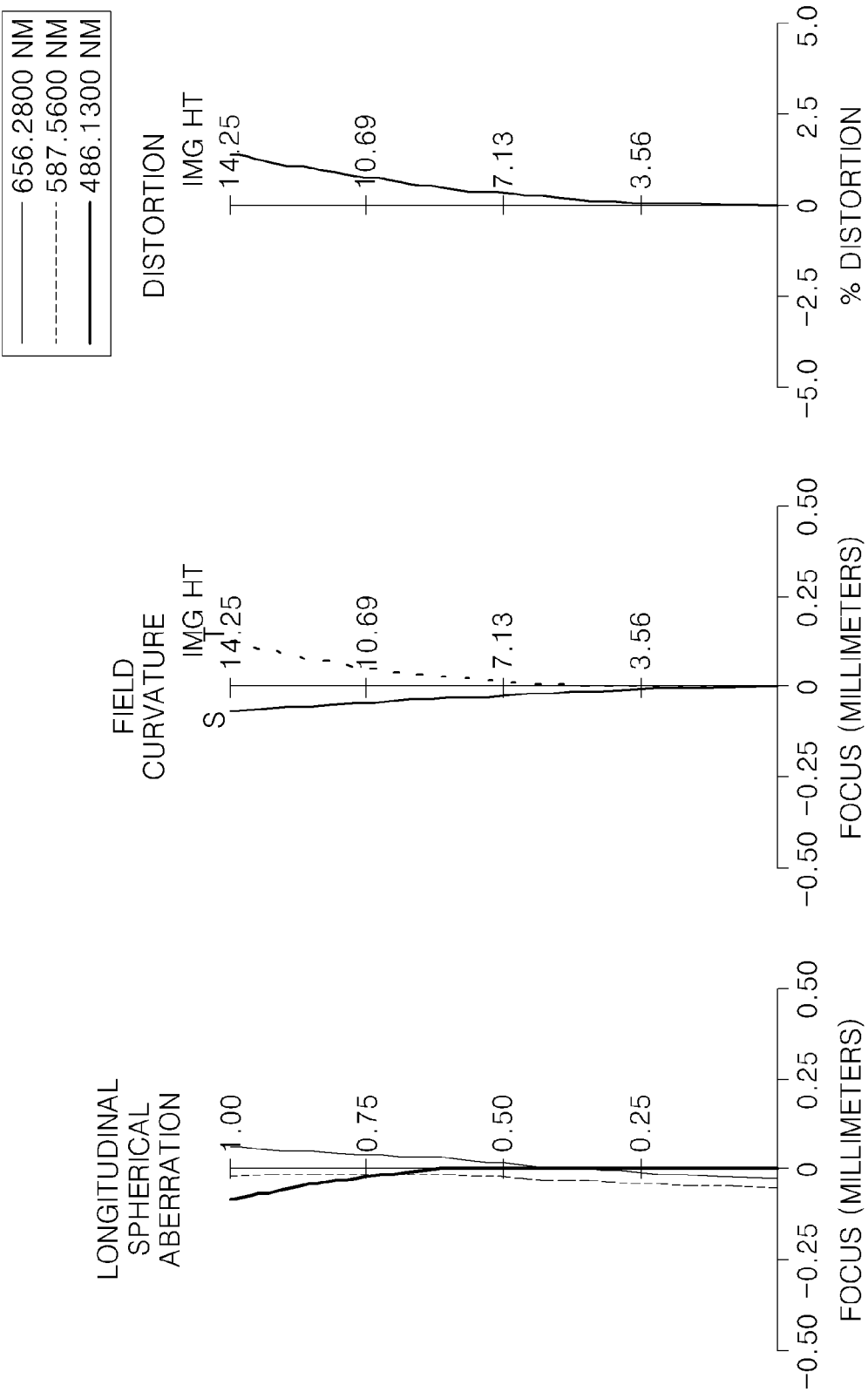

FIGS. 4A through 4C are charts of aberrations showing spherical aberration, field curvature, and distortion aberration at a wide angle position and a telephoto position of the zoom lens of FIG. 3, respectively.

Embodiment 3

FIG. 5 illustrates a zoom lens according to a third embodiment, and the following Table 5 shows design data of the third embodiment.

Referring to FIG. 5, the zoom lens according to the third embodiment includes a first lens group G1 having a positive refractive power, a second lens group G2 having a negative refractive power, a third lens group G3 having a negative refractive power, a fourth lens group G4 having a positive refractive power, and a fifth lens group G5 having a positive refractive power. The third lens group G3 may perform focusing. The fourth lens group G4 includes a first sub-lens group G4-1 having a positive refractive power and a second sub-lens group G4-2 having a negative refractive power, and the second sub-lens group G4-2 may perform a hand shake correction function.

TABLE 5

EFL: 16.40~36.00~67.00 mm Fno: 4.0~4.0~4.0
2w: 84.4~42.9~23.7 (degrees)

| Lens surface | Radius of curvature (R) | Thickness (Dn) | Nd | Vd |
|---|---|---|---|---|
| S1 | 155.000 | 2.00 | 1.84666 | 23.8 |
| S2 | 55.269 | 9.91 | 1.72916 | 54.7 |
| S3 | 379.786 | 0.20 | | |
| S4 | 48.925 | 6.41 | 1.78590 | 43.9 |
| S5 | 130.000 | D1 | | |
| S6 | 60.532 | 1.50 | 1.85596 | 39.4 |
| S7 | 14.497 | 7.71 | | |
| S8* | −215.972 | 1.20 | 1.70687 | 56.0 |

ASP
K: 0.000000
A: −5.310000e−006 B: 1.260000e−008 C: −2.210000e−010
D: 4.720000e−013

| | | | | |
|---|---|---|---|---|
| S9 | 30.615 | 0.20 | | |
| S10 | 21.082 | 3.10 | 1.92286 | 20.9 |
| S11 | 41.024 | D2 | | |
| S12 | −56.387 | 1.20 | 1.65160 | 58.4 |
| S13 | 25.848 | 2.00 | 1.84666 | 23.8 |
| S14 | 95.527 | D3 | | |
| ST | Infinity | 1.00 | | |
| S16 | 49.507 | 2.15 | 1.80610 | 40.7 |
| S17 | −1520.802 | 0.10 | | |
| S18 | 21.598 | 4.12 | 1.48749 | 70.4 |
| S19 | −31.897 | 1.20 | 1.80518 | 25.5 |
| S20 | −5043.006 | 1.54 | | |
| S21 | 71.740 | 1.20 | 1.75572 | 34.8 |
| S22 | 23.885 | 2.50 | 1.89079 | 34.2 |
| S23 | 38.585 | D4 | | |
| S24 | 42.911 | 2.08 | 1.72916 | 54.7 |
| S25 | −1114.675 | 0.42 | | |
| S26 | 28.800 | 2.69 | 1.61800 | 63.4 |
| S27 | 285.484 | 0.71 | | |
| S28 | −420.880 | 1.20 | 1.83400 | 37.3 |
| S29 | 25.507 | 3.11 | 1.49700 | 81.6 |
| S30 | −200.549 | 1.28 | | |
| S31* | −500.000 | 2.10 | 1.80610 | 40.7 |

ASP
K: −1.000000
A: −3.232665e−005 B: −5.424511e−008 C: −6.197597e−011
D: 0.000000e+000

| | | | | |
|---|---|---|---|---|
| S32 | 604.502 | D5 | | |
| S33 | Infinity | 2.80 | 1.51680 | 64.2 |
| S34 | Infinity | 0.49 | | |
| IMG | | | | |

The following Table 6 shows data regarding variable distances during zooming of the zoom lens according to the third embodiment.

TABLE 6

| Variable distance | Wide angle position | Middle position | Telephoto position |
|---|---|---|---|
| D1 | 1.20 | 14.84 | 26.94 |
| D2 | 6.00 | 10.15 | 5.0 |
| D3 | 20.54 | 4.42 | 2.20 |
| D4 | 8.39 | 3.24 | 2.13 |
| D5 | 22.07 | 39.15 | 47.57 |

Figure 6A:
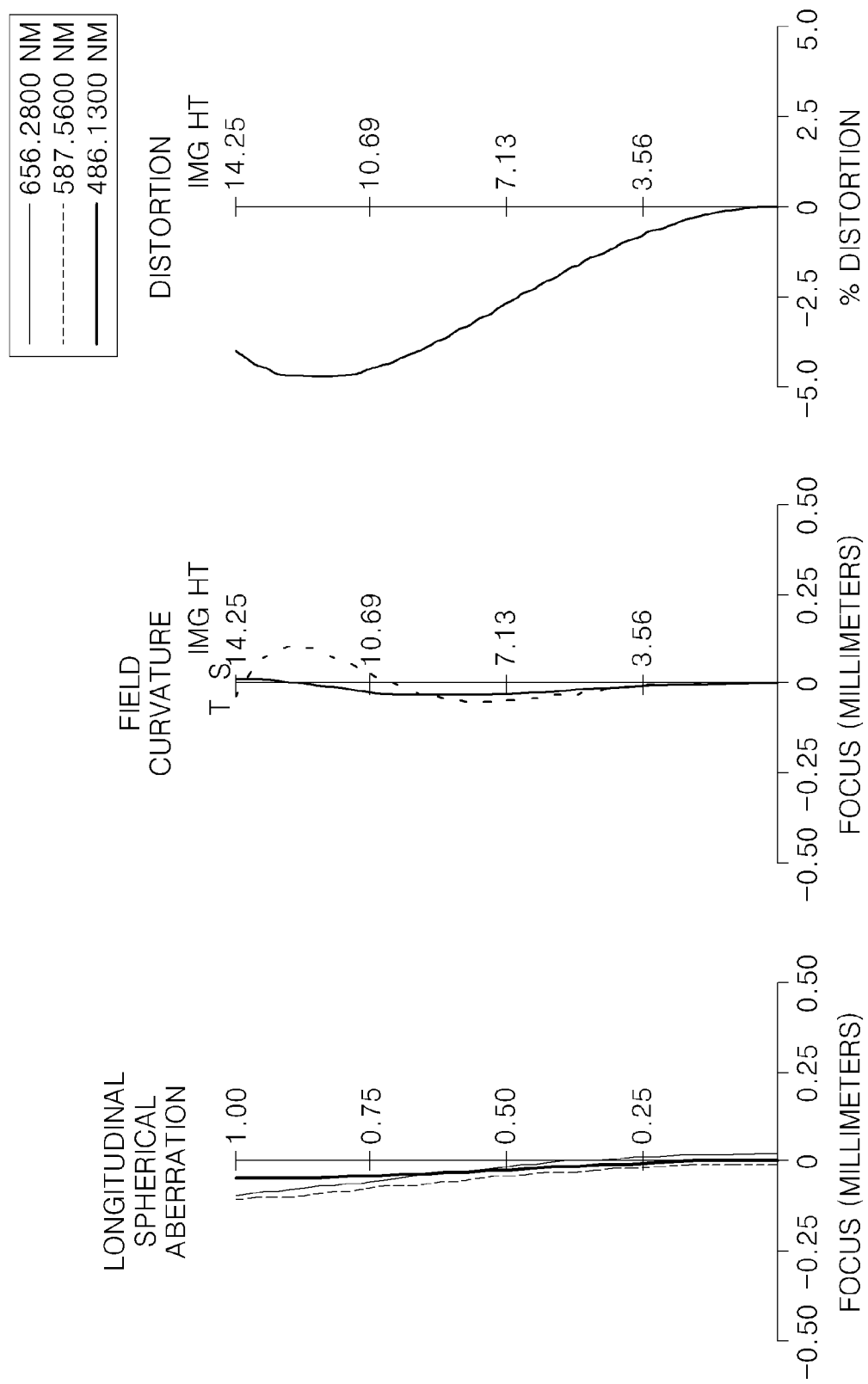
FIGS. 6A through 6C are charts of aberrations at the wide angle position and telephoto position of the zoom lens of FIG. 5, respectively.
Figure 6B:
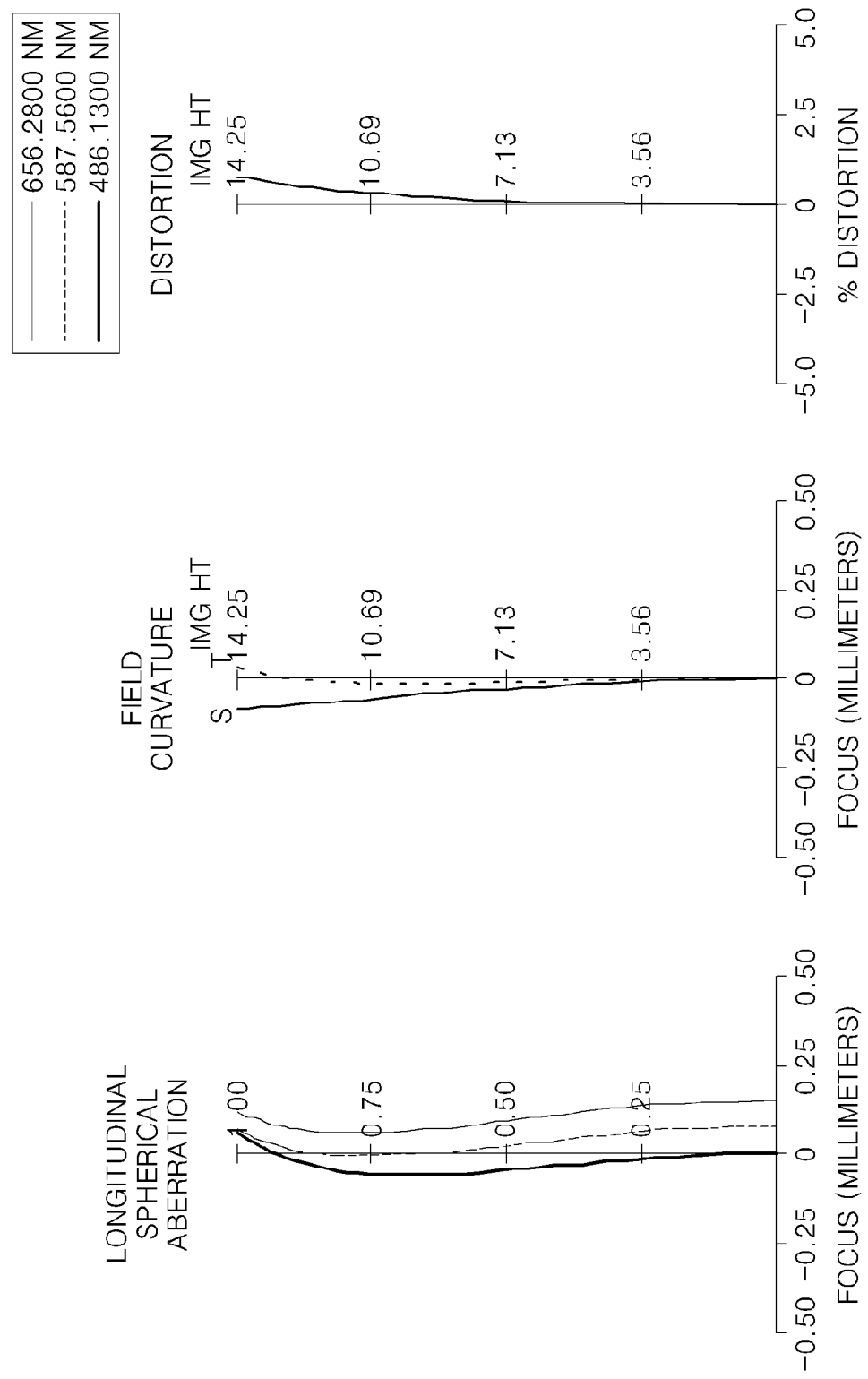
Figure 6C:
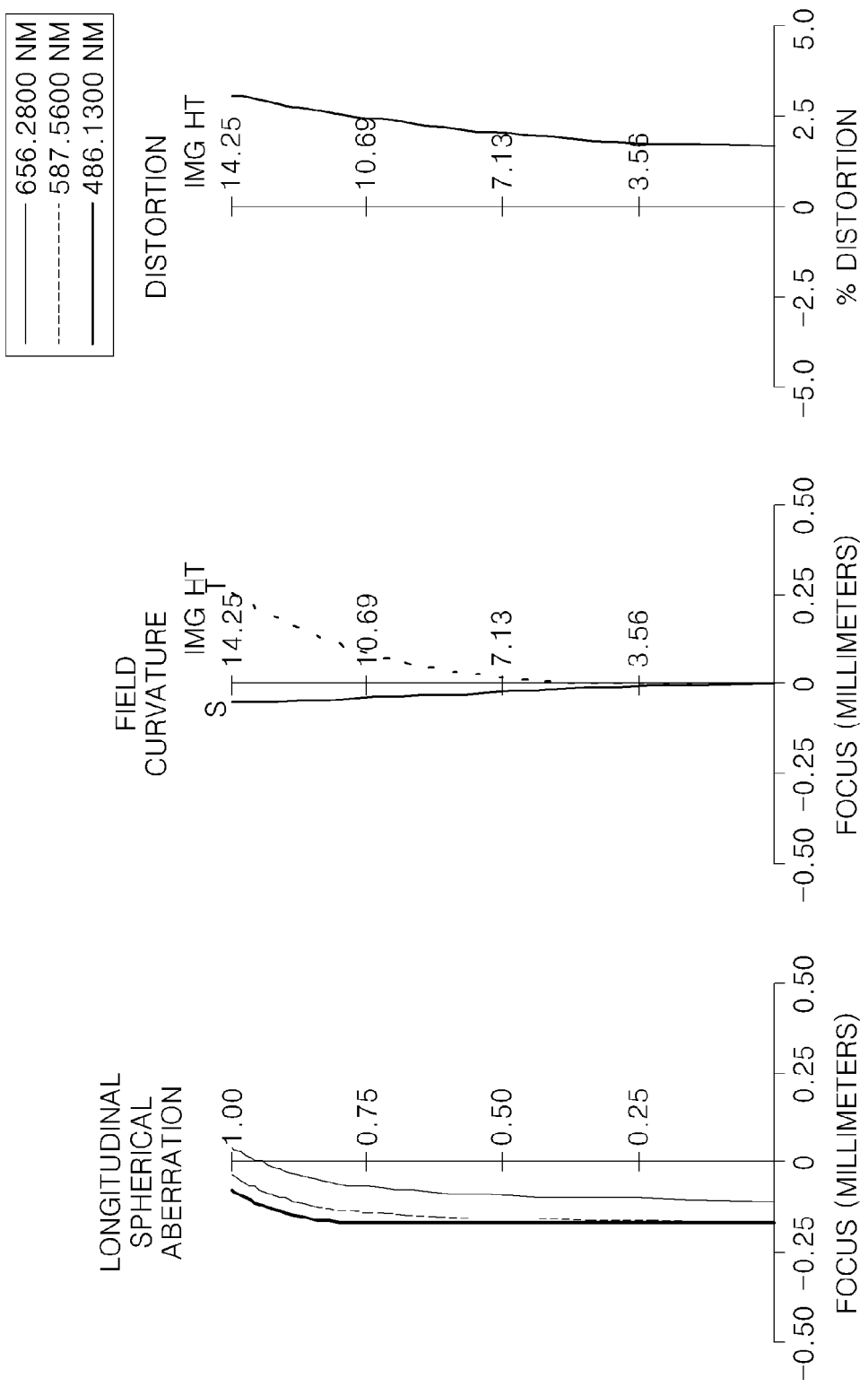

FIGS. 6A through 6C are charts of aberrations showing spherical aberration, field curvature, and distortion aberration at a wide angle position and a telephoto position of the zoom lens of FIG. 5, respectively.

The following Table 7 shows that the zoom lens according to the first through third embodiments satisfies Equations 1 through 4.

TABLE 7

| | Embodiment 1 | Embodiment 2 | Embodiment 3 |
|---|---|---|---|
| Equation 1 | 2.4 | 4.8 | 2.2 |
| Equation 2 | 1.97 | 2.47 | 1.28 |
| Equation 3 | 0.19 | 0.15 | 0.17 |
| Equation 4 | 1.904 | 1.891 | 1.922 |

The zoom lens according to the first through third embodiments may have a small size and may be implemented as a bright lens on which fast auto-focusing may be performed. The zoom lens according to the first through third embodiments may be applied to photographing apparatuses, such as digital cameras using a solid state imaging device, such as a charge-coupled device (CCD) or a complementary metal oxide semiconductor (CMOS), exchangeable lens cameras, video cameras, portable mobile phones, and the like.

Figure 7:
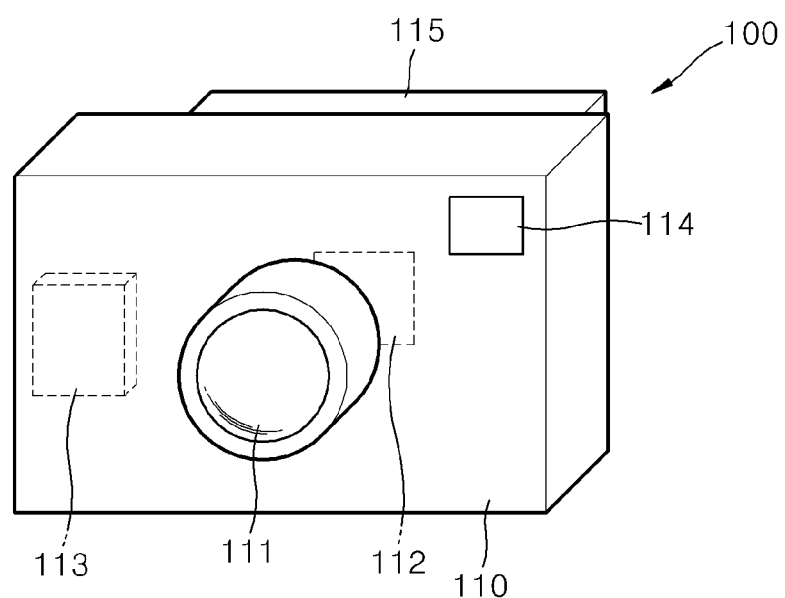
FIG. 7 illustrates a photographing apparatus including a zoom lens according to an embodiment.

FIG. 7 illustrates a photographing apparatus 100 including a zoom lens 111 according to an embodiment and an imaging device 112 that converts light condensed by the zoom lens 111 into an electrical image signal. The photographing apparatus 100 may also include a recording unit 113 on which information corresponding to an image of a subject that is photoelectrically converted by the imaging device 112 is recorded, and a view finder 114 to observe the image of the subject. The photographing apparatus 100 may further include a display unit 115 on which the image of the subject is displayed. The view finder 114 and the display unit 115 may be separately disposed. Alternatively, the photographing apparatus 100 may include the display unit 115 without the view finder 114. The photographing apparatus 100 of FIG. 7 is just an example, and the zoom lens embodiments disclosed herein may be used in a variety of photographing apparatus, such as a digital camera, so that an optical device having a small size and high optical performance may be provided.

According to the disclosed embodiments, there is provided a small-sized zoom lens having a large aperture and having a high optical performance from a visible light region to a near infrared light region and a photographing apparatus including the zoom lens.

While embodiments have been shown and described herein, it will be understood by those of ordinary skill in the art that various changes in form and details may be made therein without departing from the spirit and scope defined by the following claims.

What is claimed is:
1. A zoom lens comprising, in an order from an object side to an image side:
a front lens group having a negative refractive power;
an aperture stop; and
a rear lens group having a positive refractive power,
wherein the front lens group comprises a first lens group having a positive refractive power, a second lens group having a negative refractive power, and a third lens group having a negative refractive power, and
the third lens group comprises at least one positive lens and one negative lens and performs focusing, and
the rear lens group comprises at least two lens groups that move during zooming and have a positive refractive power, wherein at least one of the two lens groups perform hand shake correction, and the zoom lens satisfies the following Equations:

$$1.5 < |(1-m_s^2) \cdot m_s^2| < 6$$

$$1.0 < f1/f_T < 3.0$$

where $m_s$ is a magnification of the third lens group at a telephoto position of the zoom lens, $m_R$ is a synthesis magnification of the rear lens group in the telephoto position of the zoom lens, $f_T$ is an overall focal length in the telephoto position of the zoom lens, and f1 is a focal length of the first lens group.

2. The zoom lens of claim 1, wherein, when movement from a wide angle position to the telephoto position is performed during zooming, the first lens group and the third lens group are moved, and the second lens group is fixed.

3. The zoom lens of claim 2, wherein, when moving from the wide angle position to the telephoto position, the first lens group is moved toward the object side.

4. The zoom lens of claim 3, wherein the zoom lens satisfies the following Equation:

$$0.1 < L1/LT < 0.25$$

where L1 is a distance the first lens group moves during the wide angle position to the telephoto position, and LT is an overall length of the zoom lens in the telephoto position.

5. The zoom lens of claim 1, wherein at least one of the two lens groups that perform hand shake correction comprise at least one positive lens and one negative lens.

6. The zoom lens of claim 1, wherein the second lens group comprises a plurality of negative lenses and at least one positive lens.

7. The zoom lens of claim 6, wherein the plurality of negative lenses of the second lens group comprise at least one aspherical surface.

8. The zoom lens of claim 6, wherein at least one of the plurality of negative lenses of the second lens group has a refractive index greater than 1.85.

9. The zoom lens of claim 1, wherein the rear lens group comprises a fourth lens group, a fifth lens group, and a sixth lens group that move during zooming, respectively, and the fifth lens group performs hand shake correction.

10. The zoom lens of claim 1, wherein the rear lens group comprises a fourth lens group and a fifth lens group that are moved during zooming, respectively, and at least one of the lenses of the fifth lens group performs hand shake correction.

11. The zoom lens of claim 1, wherein the rear lens group comprises a fourth lens group and a fifth lens group that move during zooming, respectively, and at least one of the lenses of the fourth lens group performs hand shake correction.

12. The zoom lens of claim 1, wherein the third lens group comprises a cemented lens comprising a positive lens and a negative lens.

13. The zoom lens of claim 1, wherein the zoom lens has an F number in a range of 2.8 to 4, and the F number of the zoom lens does not vary during zooming.

14. A photographing apparatus comprising:
a zoom lens; and
an image device that receives light of an image formed by the zoom lens,
wherein the zoom lens comprises, in an order from an object side to an image side:
a front lens group having a negative refractive power;
an aperture stop; and
a rear lens group having a positive refractive power,
wherein the front lens group comprises a first lens group having a positive refractive power, a second lens group having a negative refractive power, and a third lens group having a negative refractive power, and
the third lens group comprises at least one positive lens and one negative lens and performs focusing, and
the rear lens group comprises at least two lens groups that move during zooming and have a positive refractive power, wherein at least one of the two lens groups perform hand shake correction, and
the zoom lens satisfies the following Equations:

$$1.5 < |(1-m_s^2) \cdot m_s^2| < 6$$

$$1.0 < f1/f_T < 3.0$$

where $m_s$ is a magnification of the third lens group at a telephoto position of the zoom lens, $m_R$ is a synthesis magnification of the rear lens group in the telephoto position of the zoom lens, $f_T$ is an overall focal length in the telephoto position of the zoom lens, and f1 is a focal length of the first lens group.

15. The photographing apparatus of claim 14, wherein, during zooming from the wide angle position to the telephoto position, the first lens group and the third lens group move and the second lens group is fixed.

16. The photographing apparatus of claim 15, wherein, when moving from the wide angle position to the telephoto position, the first lens group moves toward the object side.

17. The photographing apparatus of claim 16, wherein the zoom lens satisfies the following Equation:

$$0.1 < L1/LT < 0.25$$

where L1 is a distance the first lens group moves when zooming from the wide angle position to the telephoto position, and LT is an overall length of the zoom lens in the telephoto position.

18. The photographing apparatus of claim 14, wherein at least one of the two lens groups that perform hand shake correction comprise at least one positive lens and one negative lens.

* * * * *